United States Patent
Yang

(10) Patent No.: US 12,517,764 B2
(45) Date of Patent: Jan. 6, 2026

(54) ARTIFICIAL NEURAL NETWORK MODULE FOR PERFORMING ARTIFICIAL NEURAL NETWORK OPERATION ON PLURALITY OF SUBGRAPHS AND OPERATING METHOD THEREOF

(71) Applicant: Samsung Electronics Co., Ltd., Suwon-si (KR)

(72) Inventor: Seungsoo Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 651 days.

(21) Appl. No.: 17/950,449

(22) Filed: Sep. 22, 2022

(65) Prior Publication Data

US 2023/0105810 A1 Apr. 6, 2023

(30) Foreign Application Priority Data

Oct. 6, 2021 (KR) .................. 10-2021-0132679

(51) Int. Cl.
*G06F 9/50* (2006.01)
*G06N 3/04* (2023.01)

(52) U.S. Cl.
CPC .......... *G06F 9/5044* (2013.01); *G06F 9/505* (2013.01); *G06N 3/04* (2013.01)

(58) Field of Classification Search
CPC ...... G06F 9/5044; G06F 9/505; G06F 9/5066; G06F 9/5094; G06N 3/04; G06N 3/045; G06N 3/063; G06N 3/08; G06N 5/02; Y02D 10/00

See application file for complete search history.

(56) References Cited

U.S. PATENT DOCUMENTS

| | | |
|---|---|---|
| 9,875,445 B2 | 1/2018 | Amer et al. |
| 10,319,574 B2 | 6/2019 | Jo et al. |
| 10,973,590 B2 | 4/2021 | Boddington et al. |
| 2017/0124452 A1 | 5/2017 | Tucker et al. |
| 2019/0150793 A1 | 5/2019 | Barth et al. |
| 2019/0272460 A1 | 9/2019 | Tao |
| 2019/0370086 A1 | 12/2019 | Heilper et al. |
| 2020/0142466 A1 | 5/2020 | Naik et al. |
| 2020/0293869 A1 | 9/2020 | Meng et al. |
| 2020/0349421 A1 | 11/2020 | Tran et al. |
| 2020/0372337 A1 | 11/2020 | Ebrahimi et al. |

FOREIGN PATENT DOCUMENTS

EP 3619653 A1 3/2020

OTHER PUBLICATIONS

Extended European Search Report issued Feb. 16, 2023 in European Application No. 22197953.7.

*Primary Examiner* — Eric C Wai
(74) *Attorney, Agent, or Firm* — Fish & Richardson P.C.

(57) ABSTRACT

A method for an artificial neural network operation on a plurality of subgraphs may include generating a resource determination trigger corresponding to a target subgraph among the plurality of subgraphs included in a target neural network model; generating a control signal for hardware allocated to the target subgraph and driving resource settings in response to the resource determination trigger; changing, based on the control signal, at least one of hardware allocated to the target subgraph and driving resource settings; and performing an operation on the target subgraph based on the changed hardware and driving resource settings.

18 Claims, 8 Drawing Sheets

ARTIFICIAL NEURAL NETWORK MODULE FOR PERFORMING ARTIFICIAL NEURAL NETWORK OPERATION ON PLURALITY OF SUBGRAPHS AND OPERATING METHOD THEREOF

CROSS-REFERENCE TO RELATED APPLICATION

This application is based on and claims priority under 35 U.S.C. § 119 to Korean Patent Application No. 10-2021-0132679, filed on Oct. 6, 2021, in the Korean Intellectual Property Office, the disclosure of which is incorporated by reference herein in its entirety.

BACKGROUND

The inventive concepts relate to an artificial neural network (ANN) module, and more particularly, to an artificial neural network that performs an operation of a learning model including a plurality of subgraphs and an operation method thereof.

Artificial neural network (ANN) refers to computational architecture that models a biological brain. Deep learning and/or machine learning may be implemented based on the artificial neural network. Recently, as the number of operations to be processed using artificial neural networks has dramatically increased, there is also an increasing need for efficiently processing operations using artificial neural networks.

SUMMARY

The inventive concepts provide a method of allocating hardware to efficiently perform a neural network operation depending on a situation.

According to an aspect of the inventive concepts, there is provided a method for an artificial neural network operation, the method including generating a resource determination trigger corresponding to a target subgraph among a plurality of subgraphs included in a target neural network model; generating, in response to the resource determination trigger, a control signal, the control signal including information regarding hardware allocated to the target subgraph and driving resource settings; changing, based on the control signal, at least one of an allocation of the hardware allocated to the target subgraph or the driving resource settings; and performing an operation on the target subgraph based on the changed hardware and driving resource settings.

In addition, according to another aspect of the inventive concepts, there is provided an artificial neural network module configured to perform an artificial neural network operation, the artificial neural network module including processing circuitry configured to generate a resource determination trigger corresponding to a target subgraph among a plurality of subgraphs included in a target neural network model based on a clock signal; a generate, in response to the resource determination trigger, a control signal, the control signal including information regarding hardware allocated to the target subgraph and driving resource settings; and change, based on the control signal, at least one of an allocation of hardware allocated to the target subgraph or the driving resource settings.

According to another aspect of the inventive concepts, there is provided an electronic device including a computing device configured to perform an operation corresponding to a plurality of subgraphs constituting a target neural network model; an input/output device configured to provide data to the computing device and receive data generated by the computing device; and an artificial neural network module including processing circuitry configured to change at least one of driving resource settings or allocation of the computing device and the input/output device in response to a resource determination trigger corresponding to a target subgraph among the plurality of subgraphs.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Hereinafter, some example embodiments of the inventive concepts are described in detail with reference to the accompanying drawings.

Figure 1:
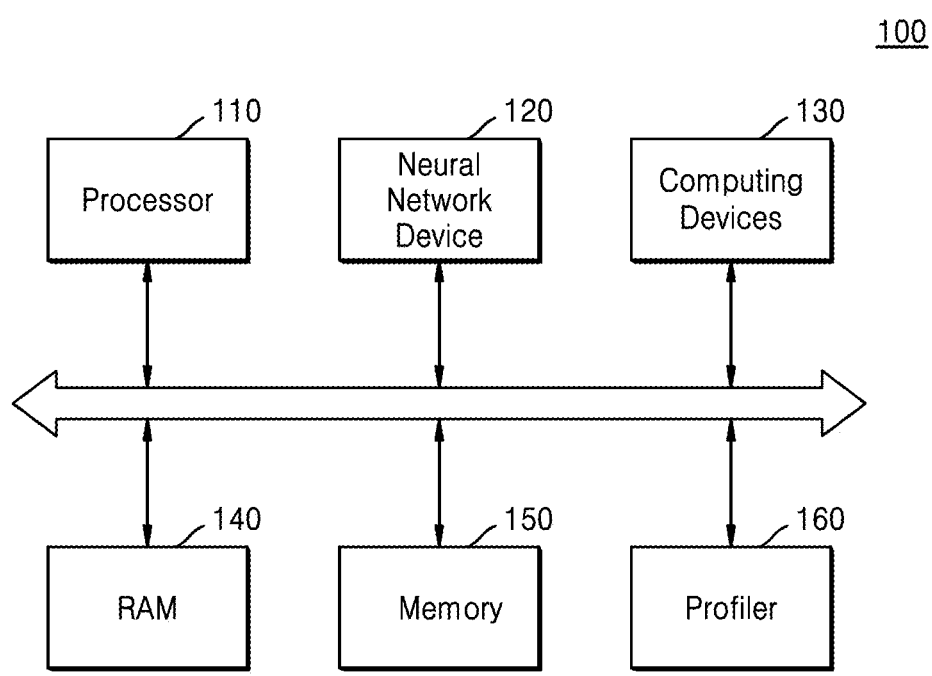
FIG. 1 is a block diagram illustrating an electronic device according to some example embodiments.

FIG. 1 is a block diagram illustrating an electronic device according to some example embodiments.

An electronic device 100 of FIG. 1 may, based on a neural network, analyze input data (e.g., in real time) to extract valid information, determine a situation based on the extracted information, and/or control the components of the electronic device mounted on the electronic device 100 (e.g., based on the determination situation).

The electronic device 100 of FIG. 1 may be, for example, an application processor (AP) employed in a mobile device. Alternatively, the electronic device 100 of FIG. 1 may correspond to a computing system, a robot device (such as a drone), an advanced driver assistance system (ADAS), a smart TV, a smart phone, a medical device, an image display device, a measurement device, an internet of things (IoT) device, and/or the like. Hereinafter, for ease of description the electronic device 100 of FIG. 1 will be described as corresponding to the application processor (AP).

Referring to FIG. 1, the electronic device 100 may include a processor 110, a neural network module 120, a computing device 130, a random access memory (RAM) 140, a memory 150, and a profiler 160. In some embodiments, at least some of the components of the electronic device 100 may be mounted on one semiconductor chip. Each of the processor 110, the neural network module 120, the computing device 130, the RAM 140, the memory 150, and the profiler 160 may transmit/receive data through a data bus.

Because the electronic device 100 performs a neural network operation, the electronic device 100 may be defined as including a neural network system. The neural network system may include at least some of the components provided in the electronic device 100 in relation to the operation of the neural network. As an example, although FIG. 1 illustrates that the neural network system includes the processor 110, the neural network module 120, and the computing devices 130, the neural network system is not limited thereto. For example, other various types of configurations involved in the operation of the neural network may be defined as being included in the neural network system.

The processor 110 controls the overall operation of the electronic device 100. The processor 110 may include one processor core (e.g., a single core) and/or a plurality of processor cores (e.g., multi-core). The processor 110 may process and/or execute programs and/or data stored in the memory 150. In some embodiments, the processor 110 may control the functions of the neural network module 120 and the computing device 130 by executing programs stored in the memory 150.

RAM 140 may temporarily store programs, data, and/or instructions. For example, programs and/or data stored in the memory 150 may be temporarily stored in the RAM 140 depending on the control (and/or boot) code of the processor 110. The RAM 140 may be implemented as, e.g., a volatile memory such as dynamic random access memory (DRAM) and/or static RAM (SRAM).

The memory 150 may store a control instruction code for controlling the electronic device 100, control data, and/or user data. The memory 150 may include at least one of a volatile memory and/or a nonvolatile memory. For example, the memory 150 may be implemented with read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), DRAM, SRAM, embedded DRAM, synchronous DRAM (SDRAM), phase-change RAM (PRAM), magnetic RAM (MRAM), resistive RAM (RRAM), ferroelectric RAM (FeRAM), solid state drive (SDD), hard disk drive (HDD), compact flash (CF), secure digital (SD), micro-SD, mini-SD, extreme digital (xD), and/or the like.

In addition, the memory 150 may store model data including a plurality of subgraphs forming one neural network model and/or may store metadata mapped to each sub graph. According to some embodiments, the memory 150 may store driving resource settings (e.g., corresponding to hardware). For example, the memory 150 may store driving resource settings for situation-specific driving resource settings for each hardware. Hereinafter, a plurality of subgraphs may be described as being configured as one neural network model.

The neural network module 120 may perform neural network-based tasks based on various types of neural networks. Operations in the neural network may be executed in the computing device 130. The neural network module 120 may generate an information signal as a result of the execution. The information signal may include one of various types of recognition signals, such as a voice recognition signal, an object recognition signal, an image recognition signal, a biometric information recognition signal, and/or the like. The neural network module 120 may also be referred to as an artificial neural network module.

The neural network may include various types of neural network models, such as a convolution neural network (CNN) (such as GoogleNet, AlexNet, and VGG network), a region with convolution neural network (R-CNN), region proposal network (RPN), recurrent neural network (RNN), stacking-based deep neural network (S-DNN), state-space dynamic neural network (S-SDNN), deconvolution network, deep belief network (DBN), restricted Boltzmann machine (RBM), fully convolutional network, long short-term memory (LSTM) network, and classification network, but is not limited thereto. Also, a neural network performing one task may include sub-neural networks, and the sub-neural networks may be implemented as heterogeneous neural network models. Alternatively and/or additionally, the neural network model may include other types of machine learning models, for example, linear and/or logistic regression, statistics clustering, Bayesian classification, determination trees, dimensional reduction such as main component analyses, expert systems, and/or random forests, and/or a combination thereof. For example, the learning model may additionally and/or alternatively include artificial neural network organizations and processing models, such as, a RNN selectively including a deconvolution neural network, a gated recurrent unit (GRU), a stacked neural network (SNN), a state-space dynamic neural network (SSDNN), a deep belief network (DBN), a generative adversarial network (GAN), a restricted Boltzmann machine (RBM), and/or the like.

Meanwhile, the electronic device 100 may execute various types of applications, and the applications may request the neural network module 120 to perform tasks based on homogeneous and/or heterogeneous neural networks. In these cases, when heterogeneous neural networks include the same sub-neural network (e.g., the same neural network model) and/or include the same operation group, the neural network module 120 may set the sub-neural network and/or the computation group to be executed singly in the same computing device in the process of executing heterogeneous neural networks.

The neural network module 120 may control the computing device 130 and the memory 150 to perform an operation for each of a plurality of subgraphs. In these cases, the neural network module 120 may receive information related to a current operation execution state from the processor 110 and/or the profiler 160. The neural network module 120 may determine a hardware allocated to a target subgraph depending on a current operation execution state and may determine the driving resource setting of the allocated hardware.

The neural network module 120 that has determined the allocated hardware and driving resource settings may transmit a command signal to a plurality of hardware to perform an operation corresponding to the target subgraph.

The neural network module 120 may be implemented in various forms, and according to some embodiments, the neural network module 120 may be implemented in (and/or by) processing circuitry such as software, hardware, and/or a combination of software and hardware. For example, in some embodiments, the neural network module 120 may be implemented in the form of software in an operating system (OS) and/or a lower level thereof and may also be implemented as programs loadable into the memory 150.

The computing device 130 may execute an operation on the received input data under the control of the neural network module 120. The computing device 130 may include a processor such as a central processing unit (CPU), a graphic processing unit (GPU), a neural processing unit (NPU), a digital signal processor (DSP), a field programmable gate array (FPGA), and an electronic control unit (ECU). In addition, the computing device 130 may include a separate memory (not shown) for storing a computing result. One of a plurality of hardware devices included in the computing device 130 may execute the merged operation group.

The profiler 160 may dynamically analyze a neural network program by measuring the time complexity and space of a program, a use of specific instructions, the period and frequency of function calls, and the like. Exemplarily, the profiler 160 may measure and analyze a program source code and/or binary executable file. The profiler 160 may provide the analysis result to the neural network module 120. The neural network module 120 may determine hardware to be allocated for the operation execution based on the analyzed result, and/or may determine a driving resource setting of the allocated hardware.

Figure 2:
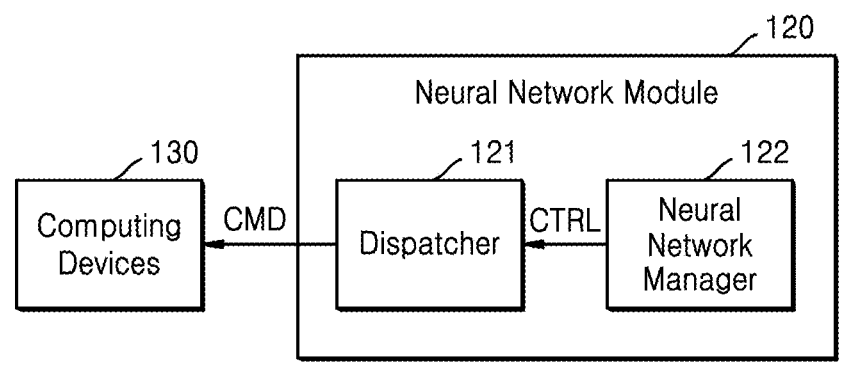
FIG. 2 is a block diagram illustrating an artificial neural network module according to some example embodiments.

FIG. 2 is a block diagram illustrating a neural network module according some example embodiments.

Referring to FIG. 2, the neural network module 120 may include a dispatcher 121 and a neural network manager 122. The neural network manager 122 may provide a control signal CTRL to the dispatcher 121 for each of the plurality of subgraphs and may change the control signal CTRL in correspondence to at least some of the plurality of subgraphs. A change in the control signal CTRL may mean a change of hardware and/or driving resource settings to perform an operation on the subgraph.

The driving resource setting may include at least one of dynamic voltage frequency scaling (DVFS) level information, signal transmission bandwidth information, last-level cache (LLC) allocation information, temperature control information, power management integrated circuit (PMIC) control information, and/or the like.

For example, the DVFS level information may be information about core voltage and/or frequency information of a system that is dynamically changed for performance optimization. For example, the neural network manager 122 may output the control signal CTRL to provide high-level DVFS level information to hardware requiring high performance. Alternatively and/or in addition, the neural network manager 122 may output the control signal CTRL to provide low-level DVFS level information to hardware capable of performing an operation even with low performance in order to minimize power loss.

The signal transmission bandwidth information may be information about bandwidth of a memory interface, and in order to transmit a large amount of data, the control signal CTRL for controlling data transmission/reception with a high bandwidth may be output.

The last-level cache allocation information may be information about a ratio of an area allocated to a last-level cache in the cache memory included in a computing hardware. For example, when the neural network module 120 requests that the operation is performed at a higher speed, the neural network manager 122 may set the computing hardware to allocate a larger portion as the last-level cache.

The temperature control information may be referred to as dynamic thermal management (DTM) information. The neural network manager 122 may output the control signal CTRL to control the temperature by adjusting the voltage or frequency of the computing hardware. For example, when a temperature of the computing hardware is higher than a threshold temperature, the neural network manager 122 may output the control signal CTRL to decrease the voltage and/or frequency.

PMIC information may be information for adjusting a supply voltage provided to each hardware. For example, when the computing hardware is requested to operate with high performance, the neural network manager 122 may output the control signal CTRL so that the PMIC may output a high power supply voltage. Additionally and/or alternatively, when the computing hardware is requested to operate with low performance and/or to reduce power loss, the neural network manager 122 may output the control signal CTRL so that the PMIC may output a low power supply voltage.

The dispatcher 121 may provide a command signal CMD to the computing devices 130 and input/output devices based on the control signal CTRL received from the neural network manager 122. The control signal CTRL may include information corresponding to hardware allocated to correspond to the subgraph and driving resource settings, and the dispatcher 121 may generate the command signal CMD based on the allocated hardware and driving resource settings.

In FIG. 2, the neural network manager 122 and the dispatcher 121 may be configured with different hardware in the neural network module 120, but the example embodiments are not limited thereto, and may be composed, e.g., of software that performs different operations on one piece of hardware.

Figure 3:
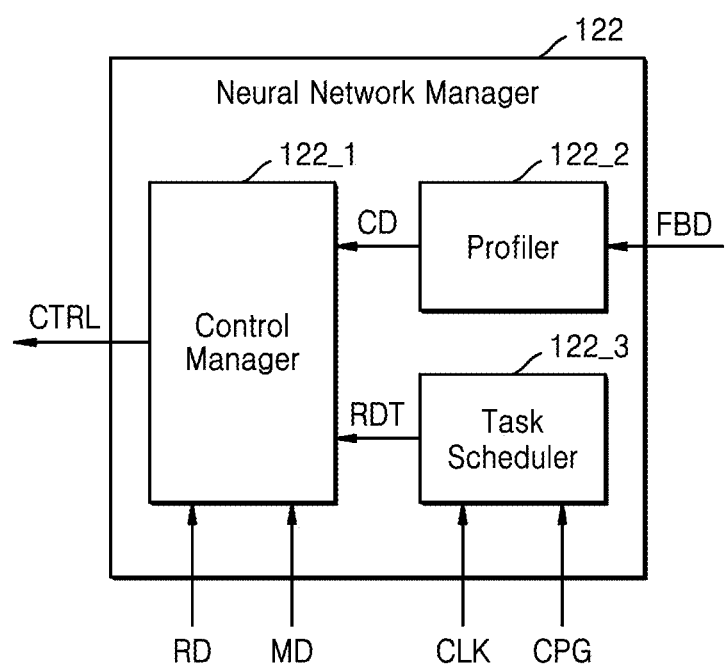
FIG. 3 is a block diagram illustrating an artificial neural network manager according to some example embodiments.

FIG. 3 is a block diagram illustrating an artificial neural network manager according to some example embodiments.

Referring to FIG. 3, the neural network manager 122 may include a control manager 122_1, a profiler 122_2, and a task scheduler 122_3. The profiler 122_2 included in the neural network manager 122 may be configured to perform the same operation as the profiler 160 shown in FIG. 1, and when a profiler (e.g., 160 of FIG. 1) is provided outside the neural network module 120 (as in the embodiment of FIG. 1), the profiler 122_2 in the example of FIG. 3 may be omitted.

The task scheduler 122_3 may receive the clock signal CLK and/or a computation processing graph CPG and may generate a resource determination trigger RDT based on the clock signal CLK and/or the computation processing graph CPG. According to some example embodiments, the task scheduler 122_3 may receive the clock signal CLK generated by the external device and generate the resource determination trigger RDT in response to the clock signal CLK.

According to some example embodiments, the task scheduler 122_3 may receive the computation processing graph CPG composed of a plurality of subgraphs and may output the resource determination trigger RDT in response to some subgraphs among the plurality of subgraphs.

The plurality of subgraphs may be composed of operation subgraphs and input/output subgraphs. The operation subgraph may be a subgraph preset in which a complex operation is to be performed, and the input/output subgraph may be a subgraph preset to which a large amount of data is input/output.

According to some example embodiments, the task scheduler 122_3 may generate the resource determination trigger RDT in response to one of the operation subgraphs and the input/output subgraphs. For example, the task scheduler 122_3 may generate the resource determination trigger RDT in response to the operation subgraph, and the neural network manager 122 may update hardware allocation and driving resource settings in response to the operation subgraph.

The profiler 122_2 may generate a computing data CD by receiving a feedback data FBD from the outside and analyzing the feedback data FBD. The feedback data FBD may be information related to a current operation execution state, for example, information related to time complexity and capacity of a program, use of a specific instruction, and cycle and frequency of a function call. However, the feedback data FBD is not limited thereto, and may include, e.g., all information for determining a bound state of the computing hardware.

The control manager 122_1 may generate the control signal CTRL in response to the resource determination trigger RDT. For example, the control manager 122_1 may output a control signal CTRL for controlling the computing hardware and the input/output hardware based on the computing data CD, a resource data RD, and/or a metadata MD.

The computing data CD may be data which the profiler 122_2 generates by analyzing the feedback data FBD and may be information related to a current operation state. For example, the profiler 122_2 may analyze that the information throughput is concentrated in the NPU among the computing hardware and may provide information indicating that the NPU is in an overload state to the control manager 122_1.

The resource data RD may include available hardware information, kernel filesystem information (e.g. kernel sysfs), power statics information (e.g., power hal information), battery capacity, DTM information, and/or the like. The resource data RD may be information related to a state of hardware. For example, when receiving the resource data RD indicating that the NPU is in a high temperature state, the control manager 122_1 may output a control signal CTRL to lower the operation throughput of the NPU.

The metadata MD may be information preset for each subgraph, and may include preference driving information, oriented task information, tensor information, and expected latency. The preference driving information may be, for example, a user mode requested by a user, and the user mode may include a power saving mode, a boost mode, and/or the like. In addition, the preference driving information may include preferred hardware information when operating a subgraph corresponding to the meta data MD. Among the computing hardware (such as the NPU, GPU, and/or CPU), preferred (e.g., preferential) computing hardware for performing an operation for each learning model may be preset (and/or otherwise determined) as metadata MD. In addition, the operation throughput may be different for each subgraph, and preferred computing hardware depending on the operation throughput may be preset as the metadata MD.

The oriented task information may include information about whether each subgraph is an operation-oriented subgraph or an input/output-oriented subgraph. For example, when the control manager 122_1 receives meta data MD indicating that the subgraph is an operation-oriented subgraph, the control signal CTRL may be output so that the computing hardware may operate at an improved and/or maximum performance.

A tensor information may correspond to an input data size and an output data size of each subgraph. When the tensor information corresponds to input/output data of a large size, the control signal CTRL may be output so that the input/output hardware may operate at an improved and/or maximum performance.

The expected latency may be an expected delay time from when the resource determination trigger RDT is generated to hardware allocation and driving resource setting change.

When performing a neural network operation on input data, the control manager 122_1 may change hardware allocated to at least one subgraph among the learning models including a series of subgraphs and driving resource settings. Accordingly, when performing training and/or inference operation on input data, the neural network module 120 may adaptively update the allocation and settings of computing hardware and input/output hardware depending on a current computation state and/or subgraph characteristics.

In some example embodiments, the control manager 122_1, the profiler 122_2, and the task scheduler 122_3 may be embedded in different chips, respectively, and/or into a single chip, but the example embodiments are not limited thereto, and the control manager 122_1 may be built into one chip and configured to perform different operations.

Figure 4:
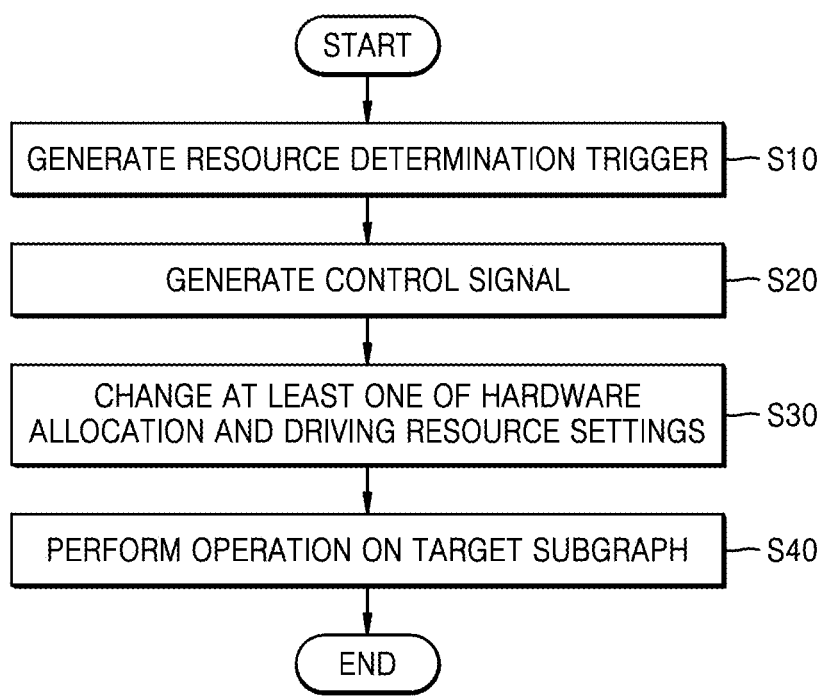
FIG. 4 is a flowchart illustrating a method of performing an artificial neural network operation on a target subgraph, according to some example embodiments.

FIG. 4 is a flowchart illustrating a method of performing an artificial neural network operation on a target subgraph, according to some example embodiments.

Referring to FIG. 4, the neural network module 120 may perform an operation on a target subgraph by changing at least one of hardware allocation and/or driving resource setting. The operation on the target subgraph may mean a training operation or an inference operation.

In step S10, the neural network module 120 may generate a resource determination trigger RDT corresponding to the target subgraph. The neural network module 120 may output a resource determination trigger RDT (e.g., immediately before performing an operation on the target subgraph). The resource determination trigger RDT that is output before an operation is performed without considering expected latency may be referred to as a basic resource determination trigger RDT.

In step S20, the neural network module 120 may generate a control signal CTRL in response to the resource determination trigger RDT. According to some embodiments, the neural network module 120 may generate the control signal CTRL based on a computing data CD, a resource data RD, and/or a metadata MD. The control signal CTRL may include information related to hardware allocation and/or driving resource setting.

In step S30, the neural network module 120 may change at least one of hardware allocation and/or driving resource setting based on the control signal CTRL. For example, in order to perform a neural network operation corresponding to the target subgraph, the neural network module 120 may allocate an operation (and/or operations) to the NPU and GPU, and may determine driving resource settings to boost NPU and GPU performance in order to perform operations at high speed.

According to some embodiments, the neural network manager 122 may generate the control signal CTRL for driving the NPU and GPU with high performance, and the dispatcher 121 may allocate the operation for the target subgraph to the NPU and GPU by receiving the control signal CTRL.

In step S40, the neural network module 120 may perform an operation on the target subgraph based on the allocated hardware and/or driving resource settings. After performing the operation on the target subgraph, the neural network module 120 may receive data (e.g., metadata MD, computing data CD, and/or resource data RD) corresponding to the subsequent subgraph in order to perform an operation on the subsequent subgraph, and may again determine hardware allocation and/or driving resource settings.

When performing an operation on input data based on a learning model, the neural network module 120 may change hardware allocation and driving resource settings in response to at least some subgraphs among a plurality of subgraphs included in the learning model. Accordingly, the neural network module 120 may allocate hardware and set driving resources to meet the current operation state and user request.

Figure 5:
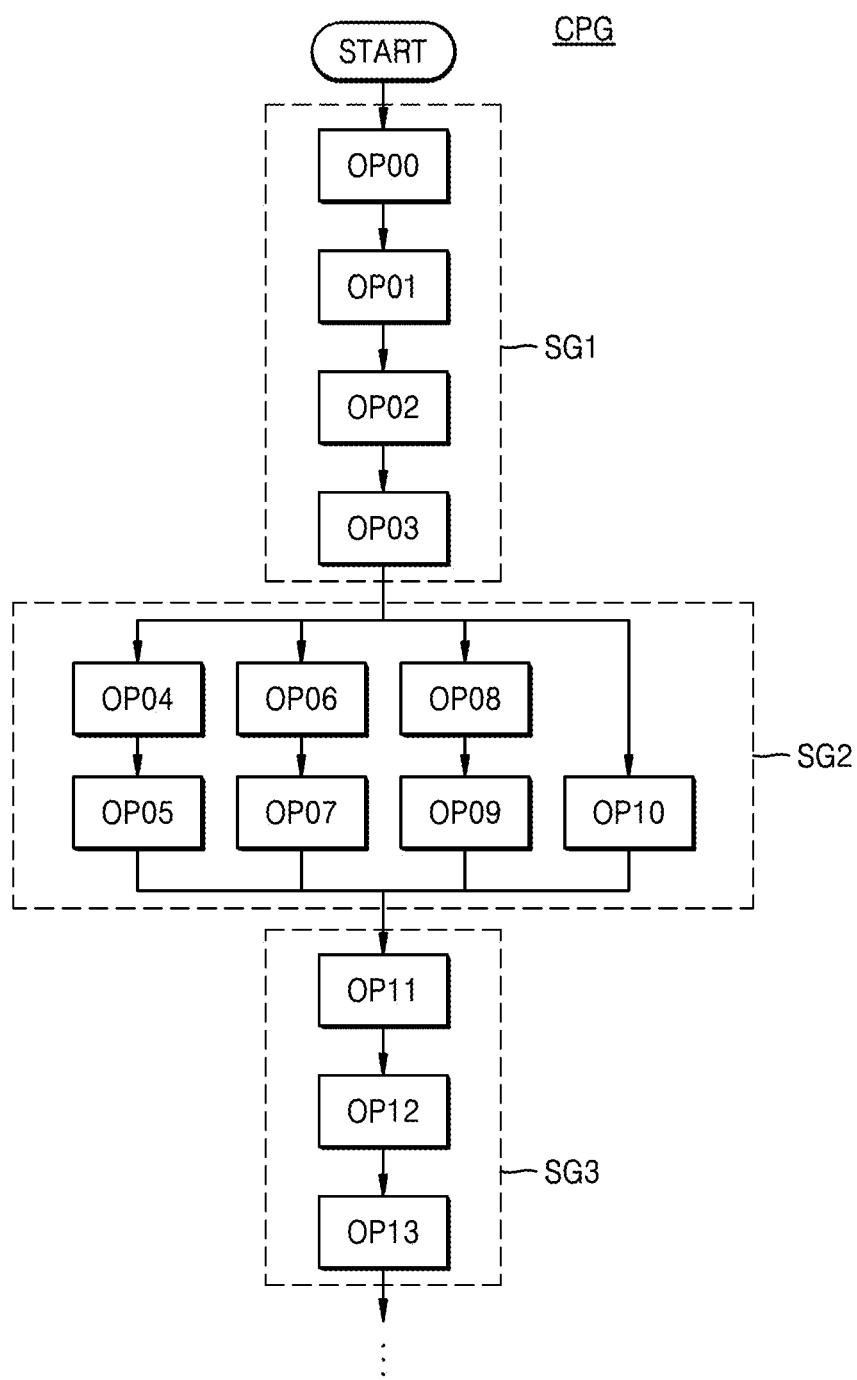
FIG. 5 is a block diagram illustrating a learning model divided into a plurality of subgraphs according to some example embodiments.

FIG. 5 is a block diagram illustrating a learning model divided into a plurality of subgraphs according to some example embodiments.

Referring to FIG. 5, the neural network module 120 may generate a computation processing graph CPG including a plurality of operations (e.g., a first operation OP00 to a fourteenth operation OP13) by analyzing a learning model. Each of the plurality of operations (first operations OP00 to the fourteenth operations OP13) may represent various mathematical operations (e.g., a convolution operation, a correction linear unit operation, a memory copy operation, etc.), and the first operations OP00 to the fourteenth operation OP13 may be the same and/or different operations.

The neural network module 120 may classify the generated computation processing graph CPG into a plurality of subgraphs SG1, SG2, SG3 based on the type of operation, an operation preference, the shape of a graph, and/or the like. In the example of FIG. 5, the neural network module 120 may group the first operation OP00 to the fourth operation OP03 into the first subgraph SG1, group the fifth operation OP04 to the eleventh operation OP10 into the second subgraph SG2, and group the twelfth operation OP11 to the fourteenth operation OP13 into the third subgraph SG3, however the example embodiments are not limited thereto.

Referring to FIGS. 3 and 5, The task scheduler 122_3 may receive the computation processing graph CPG including the first subgraph SG1 to the third subgraph SG3, and may output a resource determination trigger RDT in response to at least some of the first subgraph SG1 to the third subgraph SG3. In some example embodiments, the control manager 122_1 may allocate each of the first subgraph SG1 to the third subgraph SG3 to an appropriate resource based on the operation performance capability of the plurality of hardware.

The task scheduler 122_3 may output the resource determination trigger RDT before performing an operation for each subgraph, and the control manager 122_1 may allocate hardware to perform an operation in response to the resource determination trigger RDT. For example, the control manager 122_1 may allocate the first subgraph SG1 and the third subgraph SG3 to the first hardware (e.g., NPU) and allocate the second subgraph SG2 to the second hardware (e.g., GPU). In another example, the control manager 122_1 may allocate the first subgraph SG1 to the first hardware (e.g., NPU), allocate the second subgraph SG2 to the second hardware (e.g., GPU), and allocate the third subgraph SG3 to the third hardware (e.g., CPU). According to some embodiments, the control manager 122_1 is not limited thereto, and may allocate a plurality of hardware to correspond to one subgraph.

Figure 6:
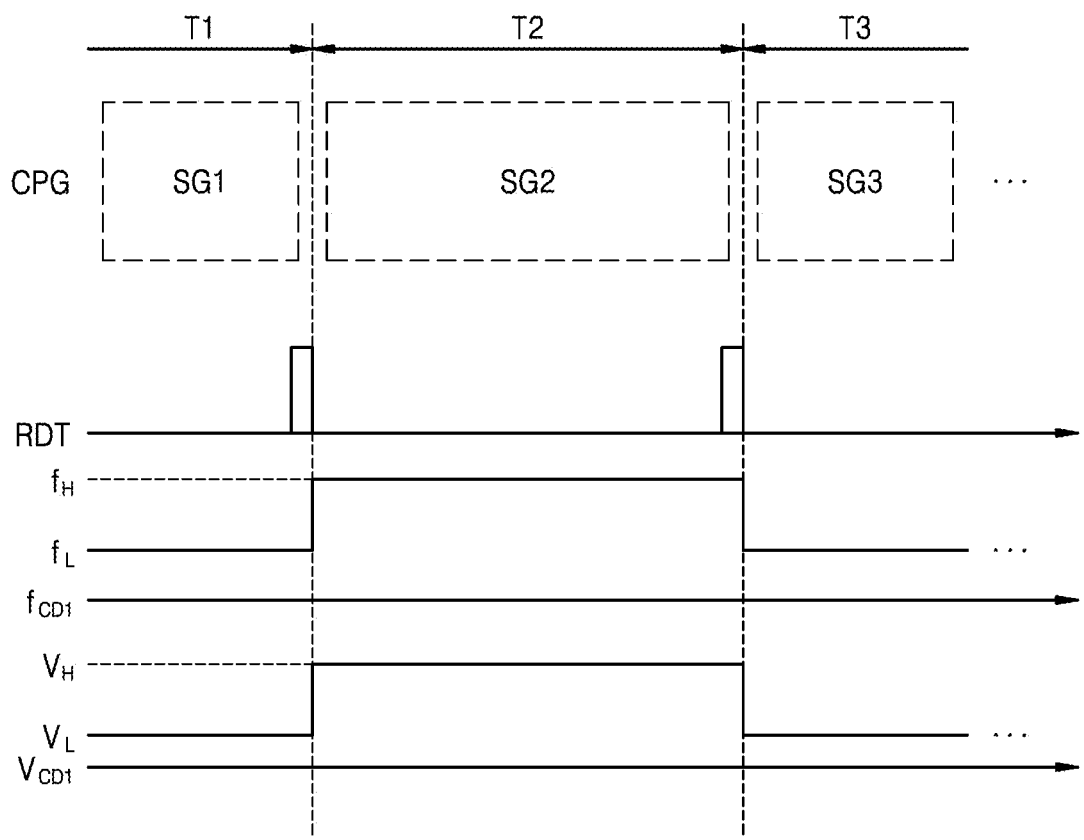
FIG. 6 is a timing diagram illustrating a resource determination trigger, a changed frequency, and control voltage generated in correspondence to a subgraph, according to some example embodiments.

FIG. 6 is a timing diagram illustrating a resource determination trigger, a changed frequency, and control voltage generated in correspondence to a subgraph, according to some example embodiments.

FIG. 6 may be a timing diagram of signals generated when the neural network module 120 performs an operation on the subgraphs described in FIG. 5. FIG. 6 illustrates an example in which driving resource settings are changed based on the first subgraph SG1, the second subgraph SG2, and the third subgraph SG3, but in the neural network module 120, the number of subgraphs for which driving resource settings are changed is not limited thereto.

In a first time T1, the neural network module 120 may perform a neural network operation on the first subgraph SG1. The neural network module 120 may provide a command signal CMD to the first computing device 130 to perform an operation. In this case, the neural network module 120 may control the driving resource to provide a low-level frequency $f_L$ and a low-level power voltage $V_L$ from the driving resource to the first computing device 130. For example, the neural network module 120 may generate a control signal CTRL set to supply the low-level frequency $f_L$ and the low-level power voltage $V_L$ and provide the control signal CTRL to the driving resource through the dispatcher 121.

The neural network module 120 may receive the resource determination trigger RDT after performing the operation on the first subgraph SG1 and before performing the operation on the second subgraph SG2. The resource determination trigger RDT is generated for every subgraph, so that the neural network module 120 may instruct resetting of the control signal CTRL, but the neural network module 120 according to an embodiment of the inventive concept is not limited thereto and may output the resource determination trigger RDT corresponding to a preset subgraph.

According to some example embodiments, when the neural network module 120 is set to focus on data operation, the resource determination trigger RDT may be generated before performing an operation on the operation subgraph. In contrast, when the neural network module 120 is set to focus on data input/output, the resource determination trigger RDT may be generated before performing an operation on the input/output subgraph.

In a second time T2, the neural network module 120 may analyze metadata MD corresponding to the second subgraph SG2 and hardware being driven to generate the control signal CTRL in response to the resource determination trigger RDT. For example, the neural network module 120 may predict the amount of data operation of the second subgraph SG2, and the module may determine whether additional computing hardware is required (and/or would be beneficial) to perform a neural network operation on the second subgraph SG2 based on the load state of the computing hardware currently being driven.

According to some example embodiments, in the first time T1, the low-level frequency $f_L$ and the low-level power voltage $V_L$ is provided to the first operation device 130 having a low operation speed, and/or, when a high operation throughput is required according to an analysis result for the second subgraph SG2 in the second time T2, the neural network module 120 may generate the control signal CTRL so that the driving resource inputs the high-level frequency $f_H$ and the high-level power voltage $V_H$ to the first computing device 130.

The neural network module 120 may receive the resource determination trigger RDT after performing the operation on the second subgraph SG2 and before performing the operation on the third subgraph SG3. According to some example embodiments, in the second time T2, according to an analysis result for the second subgraph SG2, a high-level frequency $f_H$ and a high-level power voltage $V_H$, which correspond to high operation throughput, are input to the first computing device 130, and on the other hand, in the third time T3, the first computing device 130 requires a low operation speed, so the neural network module 120 may generate a control signal CTRL so that the input driving resource provides the low-level frequency $f_L$ and the low-level power supply voltage $V_L$ to the first computing device 130.

Figure 7:
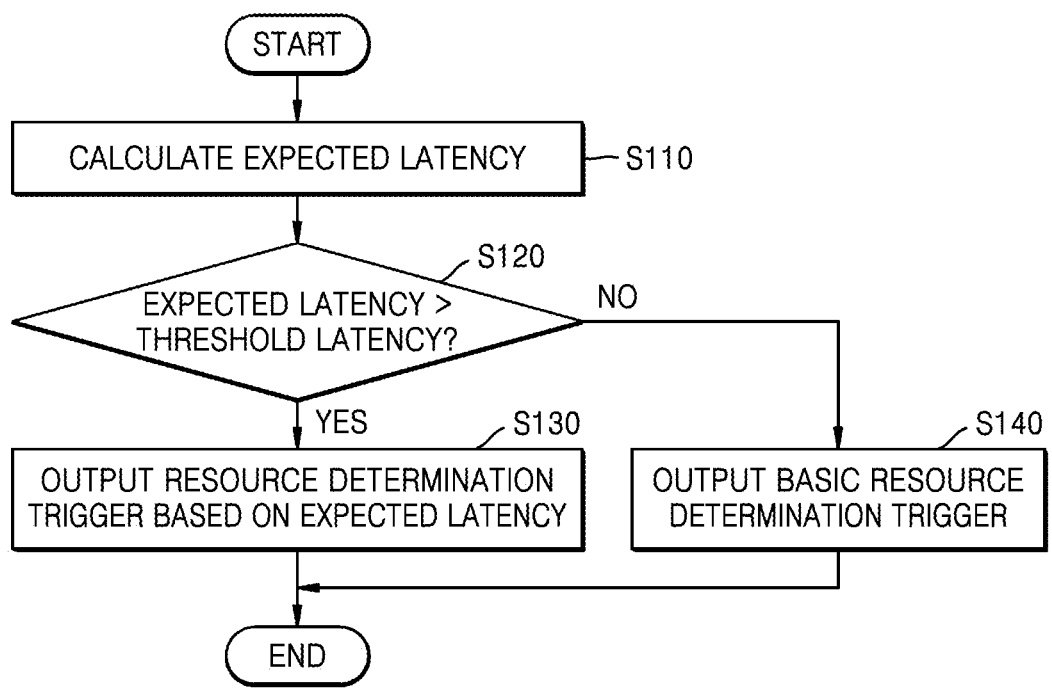
FIG. 7 is a flowchart illustrating a method of determining a time for outputting a resource determination trigger depending on an expected latency, according to some example embodiments.

FIG. 7 is a flowchart illustrating a method of determining a time for outputting a resource determination trigger (RDT) depending on an expected latency, according to some example embodiments.

Referring to FIG. 7, the neural network module 120 may output one of a basic resource determination trigger and a resource determination trigger RDT generated based on the expected latency. The expected latency may be an expected delay time from when the resource determination trigger RDT is generated until hardware allocation and driving resource setting change.

In operation S110, the neural network module 120 may calculate an expected latency for the resource determination trigger RDT. The expected latency may be preset (and/or otherwise determined) in metadata MD for each subgraph, and according to some example embodiments, the neural network module 120 may calculate the expected latency in consideration of the current operation state based on the metadata MD, the computing data CD, and the resource data RD.

According to some example embodiments, the neural network module 120 may receive the metadata MD corresponding to a target subgraph and adaptively determine the expected latency based on the current operation state of hardware from the expected latency set in the metadata MD. For example, the neural network module 120 may determine whether the computing hardware is overloaded based on the computing data CD and the resource data RD and may determine the expected latency depending on to the degree of overload when the computing hardware is overloaded.

In operation S120, the neural network module 120 may compare the expected latency with a threshold latency. The threshold latency may be a threshold preset (and/or otherwise determined) in the neural network module 120 and may be a delay time from when the resource determination trigger RDT is output until the hardware operates with a target performance.

In operation S130, when the calculated expected latency exceeds the threshold latency, the neural network module 120 may output the resource determination trigger RDT based on the expected latency. According to some example embodiments, the neural network module 120 may output the resource determination trigger RDT earlier by an expected latency from a time at which the resource determination trigger RDT is planned to be outputted. For example, a time point at which the resource determination trigger RDT is planned to be output may be a time point immediately before an operation on the target subgraph is performed or a time point after an operation on a previous subgraph of the target subgraph is terminated.

In operation S140, the neural network module 120 may output a basic resource determination trigger RDT when the expected latency is less than or equal to the threshold latency. A case in which the expected latency is determined to be less than or equal to the threshold latency may be a case in which it is determined that the hardware operation is not excessively delayed even if the resource determination trigger RDT is output immediately before performing the operation on the target subgraph.

Figure 8:
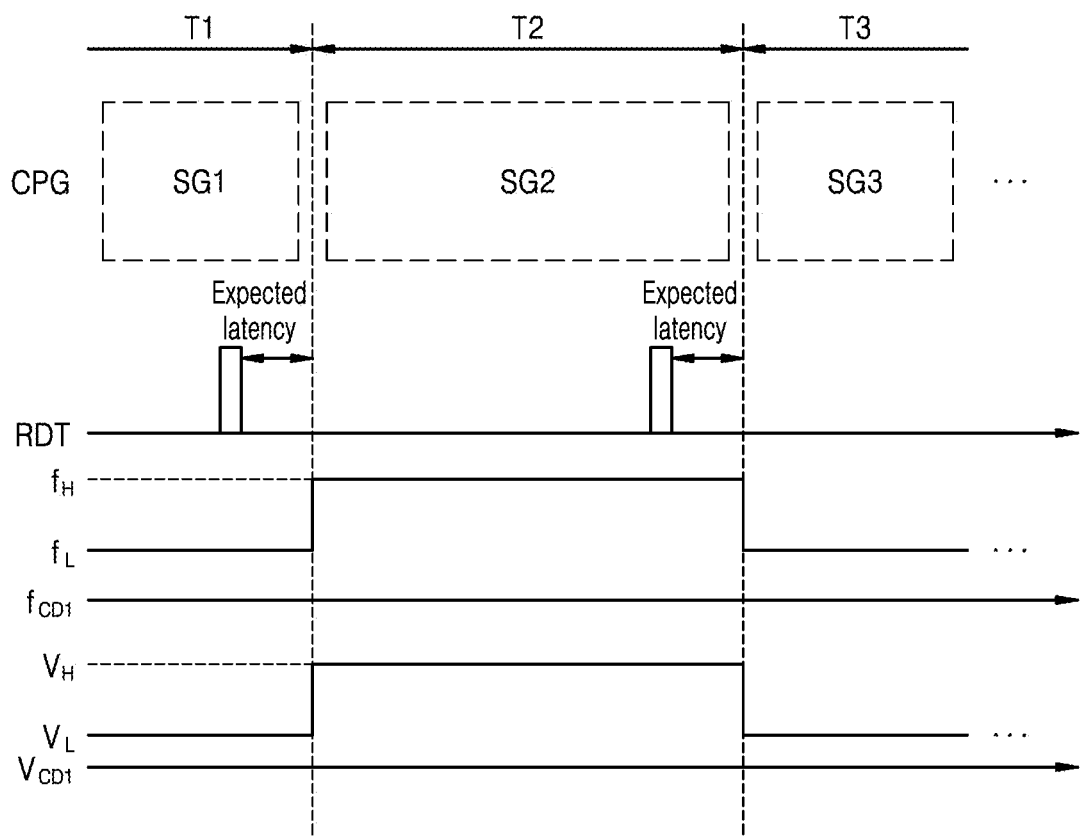
FIG. 8 is a timing diagram illustrating a resource determination trigger to which an expected latency is applied, according to some example embodiments.

FIG. 8 is a timing diagram illustrating a resource determination trigger RDT to which an expected latency is applied, according to some example embodiments.

Referring to FIG. 8, the neural network module 120 may calculate the expected latency corresponding to the second subgraph SG2 and the third subgraph SG3 and may output the resource determination trigger RDT to which the expected latency is applied by determining that the expected latency is greater than a threshold latency.

The neural network module 120 may generate the resource determination trigger RDT for the second subgraph SG2 at a point in time earlier by an expected latency from the point in time when the operation on the first subgraph SG1 is terminated. In the first time T1, the neural network module 120 may analyze metadata MD corresponding to the second sub graph SG2 and hardware being driven to generate a control signal CTRL in response to the resource determination trigger RDT. For example, the neural network module 120 may predict the amount of data operation of the second subgraph SG2 and may determine whether additional computing hardware is required (and/or would be beneficial) to perform a neural network operation on the second subgraph SG2 based on the load state of the computing hardware currently being driven.

According to some example embodiments, in the first time T1, the low-level frequency $f_L$ and the low-level power voltage $V_L$ is provided to the first operation device 130 having a low operation speed, and on the other hand, when a high operation throughput is required according to an analysis result for the second subgraph SG2 in the second time T2, the neural network module 120 may generate the control signal CTRL so that the driving resource inputs the high-level frequency $f_H$ and the high-level power voltage $V_H$ to the first computing device 130.

In the same way, the neural network module 120 may generate a resource determination trigger RDT for the third subgraph SG3 in a second time T2 that is before the third time T3, so the neural network module 120 may generate a control signal CTRL so that the input driving resource provides the low-level frequency $f_L$ and the low-level power supply voltage $V_L$ to the first computing device 130.

Figure 9:
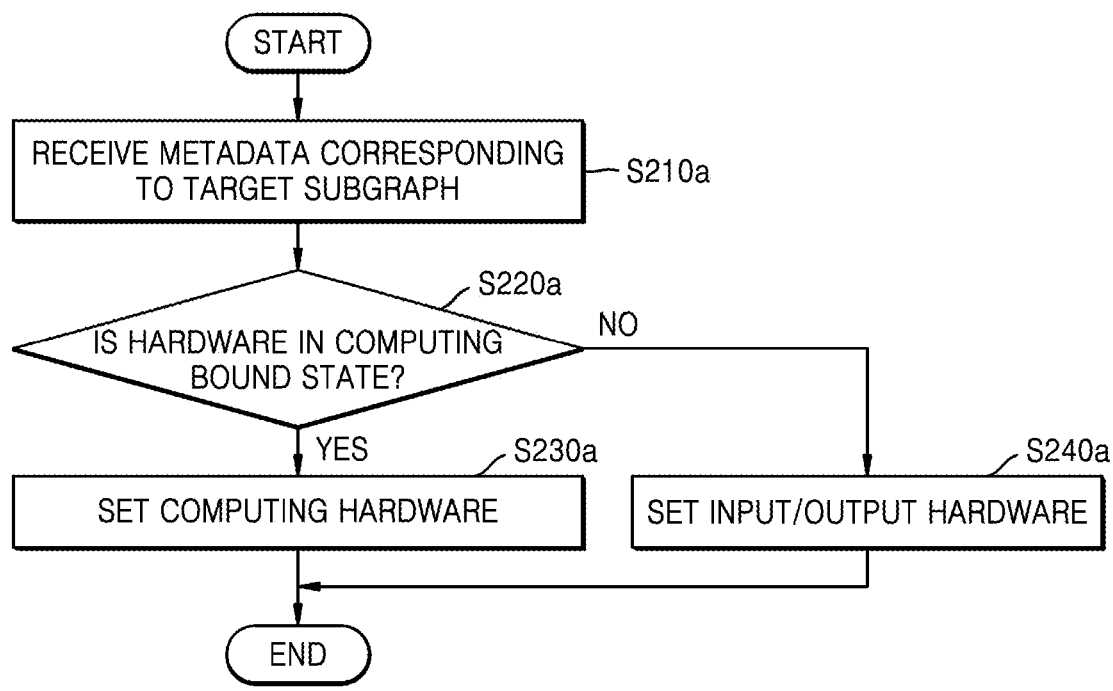
FIG. 9 is a flowchart illustrating a method of applying different settings to a target subgraph based on metadata, according to some example embodiments.

FIG. 9 is a flowchart illustrating a method of applying different settings to a target subgraph based on metadata MD, according to some example embodiments.

Referring to FIG. 9, when generating the control signal CTRL, metadata MD for each subgraph may be received, and hardware allocation and driving resource settings may be determined with different settings based on a bound state in which data throughput is concentrated.

In operation S210a, the neural network module 120 may receive metadata MD corresponding to the target subgraph. The metadata MD may include setting information for each subgraph, and different setting information may be mapped depending on the hardware state even in the same subgraph.

In operation S220a, the neural network module 120 may determine whether a hardware is in a computing-bound state in which operation throughput is concentrated. According to some example embodiments, the neural network module 120 may receive computing data CD and resource data RD corresponding to the target subgraph and may analyze the computing data CD and the resource data RD to determine whether the hardware is in a computing-bound state.

In operation S230a, when determining that the hardware is in the computing-bound state, the neural network module 120 may set maximum computing hardware so that the maximum (and/or higher) performance for data operation may be exhibited in order to perform operation on the target subgraph. For example, the metadata MD may allocate computing hardware corresponding to the target subgraph so that computing hardware such as NPU, GPU, and/or CPU may be driven with improved and/or maximum performance and may control driving resources to supply the high-level frequency $f_H$ and the high-level power voltage $V_H$ to the computing hardware.

In operation S240a, when determining that the hardware is not in the computing-bound state, the neural network module 120 may set input/output hardware so that the higher (and/or maximum) performance for a data input/output operation of providing data to the computing hardware may be exhibited. In order to enable the input/output hardware to be driven with higher and/or maximum performance, the metadata MD may control driving resources so that a high-level frequency $f_H$ and high level supply voltage $V_H$ may be supplied to the input/output hardware or data may be input/output with a high transmission bandwidth.

Figure 10:
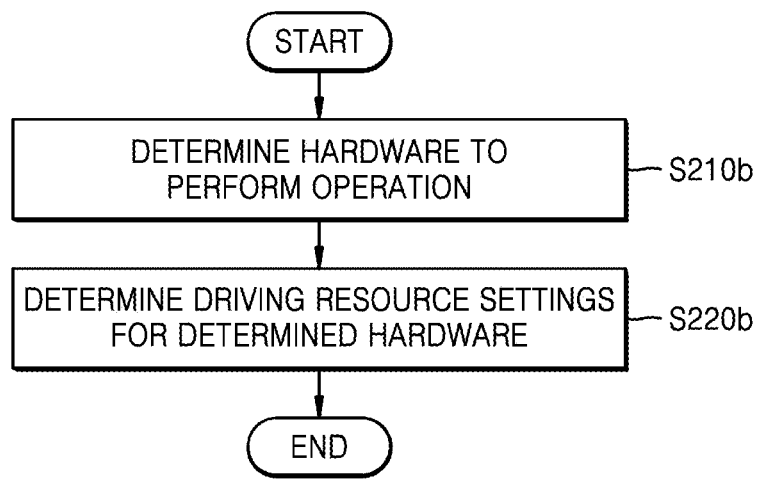
FIG. 10 is a flowchart illustrating a method of determining a driving resource setting for determined hardware, according to some example embodiments.

FIG. 10 is a flowchart illustrating a method of determining a driving resource setting for determined hardware, according to some example embodiments.

Referring to FIG. 10, the neural network module 120 according to another embodiment may determine hardware to perform an operation in response to a resource determination trigger RDT and may determine a driving resource setting for the determined hardware.

In operation S210b, the neural network module 120 may determine hardware to perform an operation. According to some example embodiments, the neural network module 120 may allocate hardware to a neural network operation based on a computing data CD and a resource data RD.

In operation S220b, the neural network module 120 may determine driving resource settings for the determined hardware. According to some example embodiments, situation-specific driving resource settings for hardware allocated to firmware, software, and/or a driving binary related to the neural network model may be previously recorded.

For example, the neural network module 120 may determine the driving resource setting to increase the performance of a memory interface before an SRAM DMA is driven. After an NPU is operated, the neural network module 120 may determine driving resource settings to increase the performance of a GPU. Therefore, the neural network module 120 may improve the performance and/or resource management of the electronic device 100.

In this disclosure, the various functional blocks denoting elements that process (and/or perform) at least one function or operation and may be included in and/or implemented as processing circuitry such hardware, software, or the combination of hardware and software. For example, the processing circuitry more specifically may include (and/or be included in), but is not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to embodiments thereof, it will be understood that various changes in form and details may be made therein without departing from the spirit and scope of the following claims.

What is claimed is:

1. A method for an artificial neural network operation, the method comprising:

generating a resource determination trigger corresponding to a target subgraph among a plurality of subgraphs included in a target neural network model;

generating, in response to the resource determination trigger, a control signal, the control signal including information regarding hardware allocated to the target subgraph and driving resource settings;

changing, based on the control signal, at least one of an allocation of the hardware allocated to the target subgraph or the driving resource settings; and performing an operation on the target subgraph based on at least one of the changed allocation of the hardware or the changed driving resource settings, wherein generating the resource determination trigger comprises calculating an expected latency for the at least one of the changed allocation of the hardware or the changed driving resource settings and determining, based on the expected latency being greater than a threshold latency, a generation time of the resource determination trigger earlier by the expected latency from a time at which the resource determination trigger is planned to be generated, wherein the time at which the resource determination trigger is planned to be generated is a time point immediately before an operation on the target subgraph is performed or a time point after an operation on a previous subgraph of the target subgraph is completed.

2. The method of claim 1, wherein the generating of the control signal comprises determining the allocation of the hardware and the driving resource settings based on bound state information regarding the hardware in which a data throughput is concentrated, wherein the bound state information comprises information about a subsequent subgraph to which the data is transmitted.

3. The method of claim 2, wherein the determining of the allocation of the hardware and the driving resource settings comprises determining the allocation of the hardware and the driving resource settings corresponding to a computing-bound state, wherein the computing-bound state is a state in which data are oriented towards an operation subgraph, when the data throughput is concentrated in computing hardware; and determining the allocation of the hardware and the driving resource settings corresponding to an input-bound state or an output-bound state when the data throughput is concentrated in input/output hardware, wherein the input-bound state is a state in which data is going to be received by an input/output subgraph, and wherein the output-bound state is a state in which data is going to be transmitted away from the input/output subgraph.

4. The method of claim 1, wherein the driving resource setting includes at least one of hardware dynamic voltage frequency scaling level information, signal transmission bandwidth information, last level cache allocation information, temperature control information, or power management integrated circuit control information.

5. The method of claim 1, wherein the generating of the control signal comprises determining the allocation of the hardware and the driving resource settings, based on metadata corresponding to each subgraph.

6. The method of claim 5, wherein the metadata includes at least one of preference driving information, oriented task information, tensor information, or expected latency for each subgraph.

7. The method of claim 6, wherein the metadata includes, for each of the plurality of subgraphs, information regarding a bound state in which a data throughput is concentrated.

8. The method of claim 5, wherein
the plurality of subgraphs includes an operation subgraph in which operation processing is concentrated and an input/output subgraph in which data is to be received or to which data is to be transmitted, and
the generating of the resource determination trigger comprises outputting the resource determination trigger corresponding to the operation subgraph.

9. The method of claim 1, wherein the generating of the control signal comprises determining the driving resource settings corresponding to the target subgraph based on situation-specific driving resource settings set for each hardware to be allocated.

10. An artificial neural network module configured to perform an artificial neural network operation, the artificial neural network module comprising:
processing circuitry configured to
generate a resource determination trigger corresponding to a target subgraph among a plurality of subgraphs included in a target neural network model based on a clock signal;
generate, in response to the resource determination trigger, a control signal, the control signal including information regarding hardware allocated to the target subgraph and driving resource settings;
change, based on the control signal, at least one of an allocation of hardware allocated to the target subgraph or the driving resource settings; and
perform an operation on the target subgraph based on the at least one of the changed allocation of the hardware or the changed driving resource settings,
wherein the process circuitry is configured to
generate the resource determination trigger by calculating an expected latency for the at least one of the changed allocation of the hardware or the changed driving resource settings and
determine, based on the expected latency being greater than a threshold latency, a generation time of the resource determination trigger earlier by the expected latency from a time at which the resource determination trigger is planned to be generated,
wherein the time at which the resource determination trigger is planned to be generated is a time point immediately before an operation on the target subgraph is performed or a time point after an operation on a previous subgraph of the target subgraph is completed.

11. The artificial neural network module of claim 10, wherein the processing circuitry is configured to:
collect data processing information of a plurality of hardware;
generate computing data based on the data processing information; and
determine the at least one of hardware or the driving resource settings based on the computing data.

12. The artificial neural network module of claim 10, wherein the processing circuitry is configured to determine the hardware and the driving resource settings based on bound state information related to the hardware in which a data throughput is concentrated.

13. The artificial neural network module of claim 10, wherein the driving resource setting includes at least one of hardware dynamic voltage frequency scaling level information, signal transmission bandwidth information, last level cache allocation information, temperature control information, or power management integrated circuit control information.

14. The artificial neural network module of claim 10, wherein the processing circuitry is configured to determine the allocation of the hardware and the driving resource settings based on metadata corresponding to each subgraph.

15. The artificial neural network module of claim 14, wherein the metadata includes at least one of preference driving information, oriented task information, tensor information, or expected latency set for each of the plurality of subgraphs.

16. The artificial neural network module of claim 15, wherein
the plurality of subgraphs comprises an operation subgraph in which operation processing is concentrated and an input/output subgraph in which data is to be received or to which data is to be transmitted, and
the processing circuitry is configured to output the resource determination trigger corresponding to the operation subgraph.

17. The artificial neural network module of claim 10, wherein the processing circuitry is configured to determine the driving resource settings corresponding to the target subgraph based on situation-specific driving resource settings set for each hardware to be allocated.

18. An electronic device comprising:
a computing device configured to perform an operation corresponding to a plurality of subgraphs constituting a target neural network model;
an input/output device configured to provide data to the computing device and receive data generated by the computing device; and
an artificial neural network module including processing circuitry configured to change at least one of driving resource settings or allocation of the computing device and the input/output device in response to a resource determination trigger corresponding to a target subgraph among the plurality of subgraphs,
wherein the resource determination trigger is generated by calculating an expected latency for the at least one of the changed driving resource settings or the changed allocation of the computing device and the input/output device and determining, based on the expected latency being greater than a threshold latency, a generation time of the resource determination trigger earlier by the expected latency from a time at which the resource determination trigger is planned to be generated, and
wherein the time at which the resource determination trigger is planned to be generated is a time point immediately before an operation on the target subgraph is performed or a time point after an operation on a previous subgraph of the target subgraph is completed.

* * * * *